March 22, 1955  R. BAADER  2,704,377
APPARATUS FOR REMOVING THE BACKBONES FROM FISH
Filed Aug. 19, 1950  6 Sheets-Sheet 1

Inventor
RUDOLF BAADER
By Richard E. Gion
Attorneys

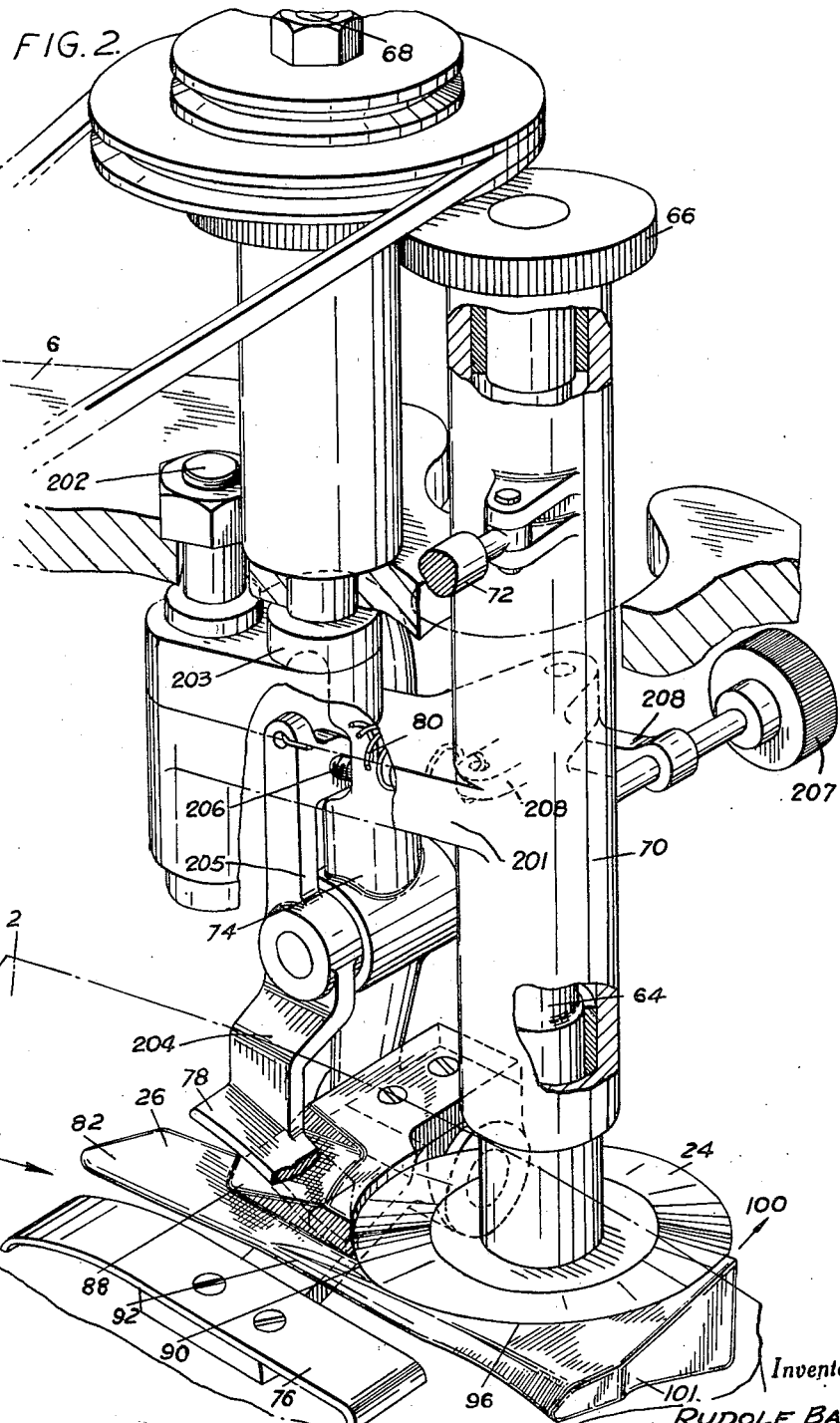

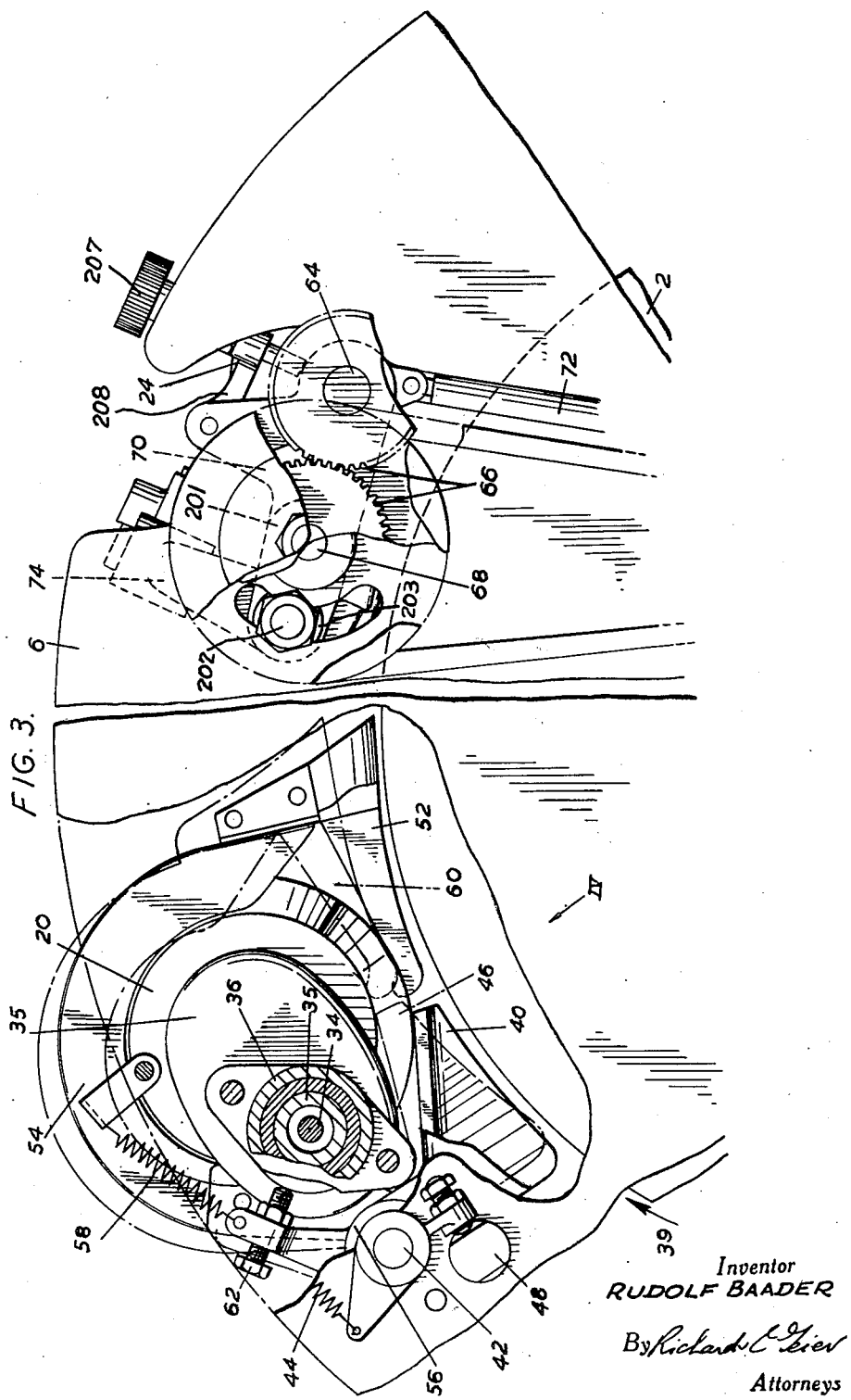

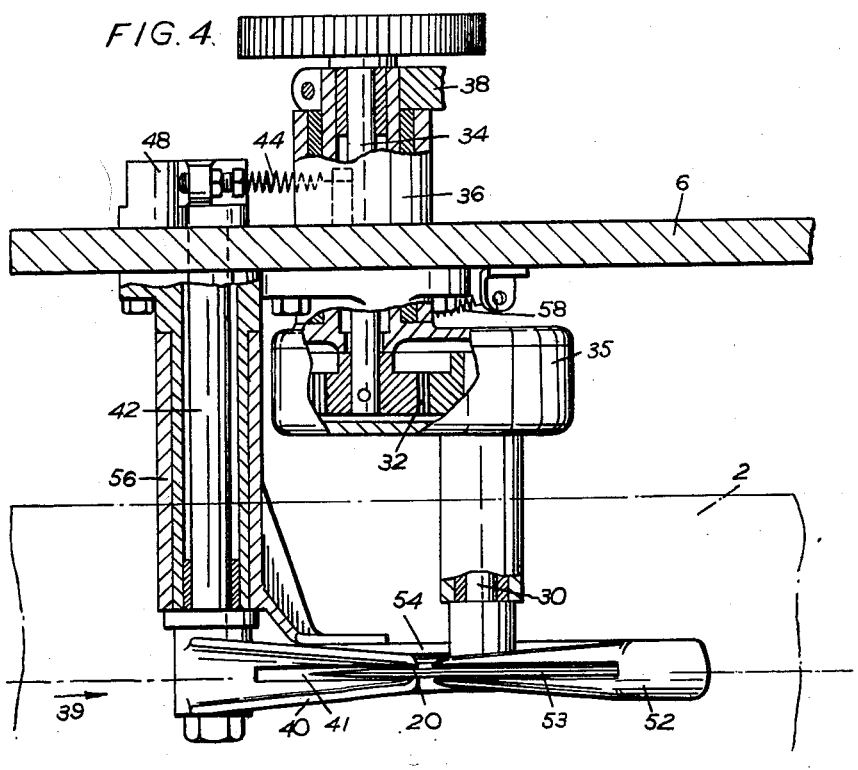
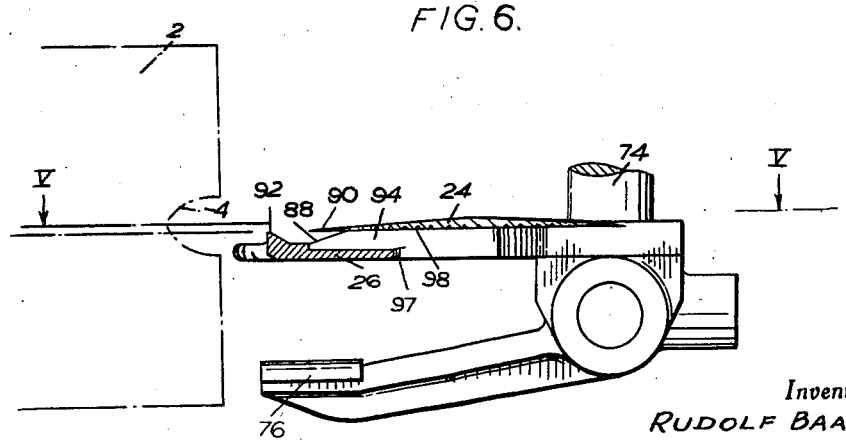

March 22, 1955  R. BAADER  2,704,377
APPARATUS FOR REMOVING THE BACKBONES FROM FISH
Filed Aug. 19, 1950  6 Sheets-Sheet 5
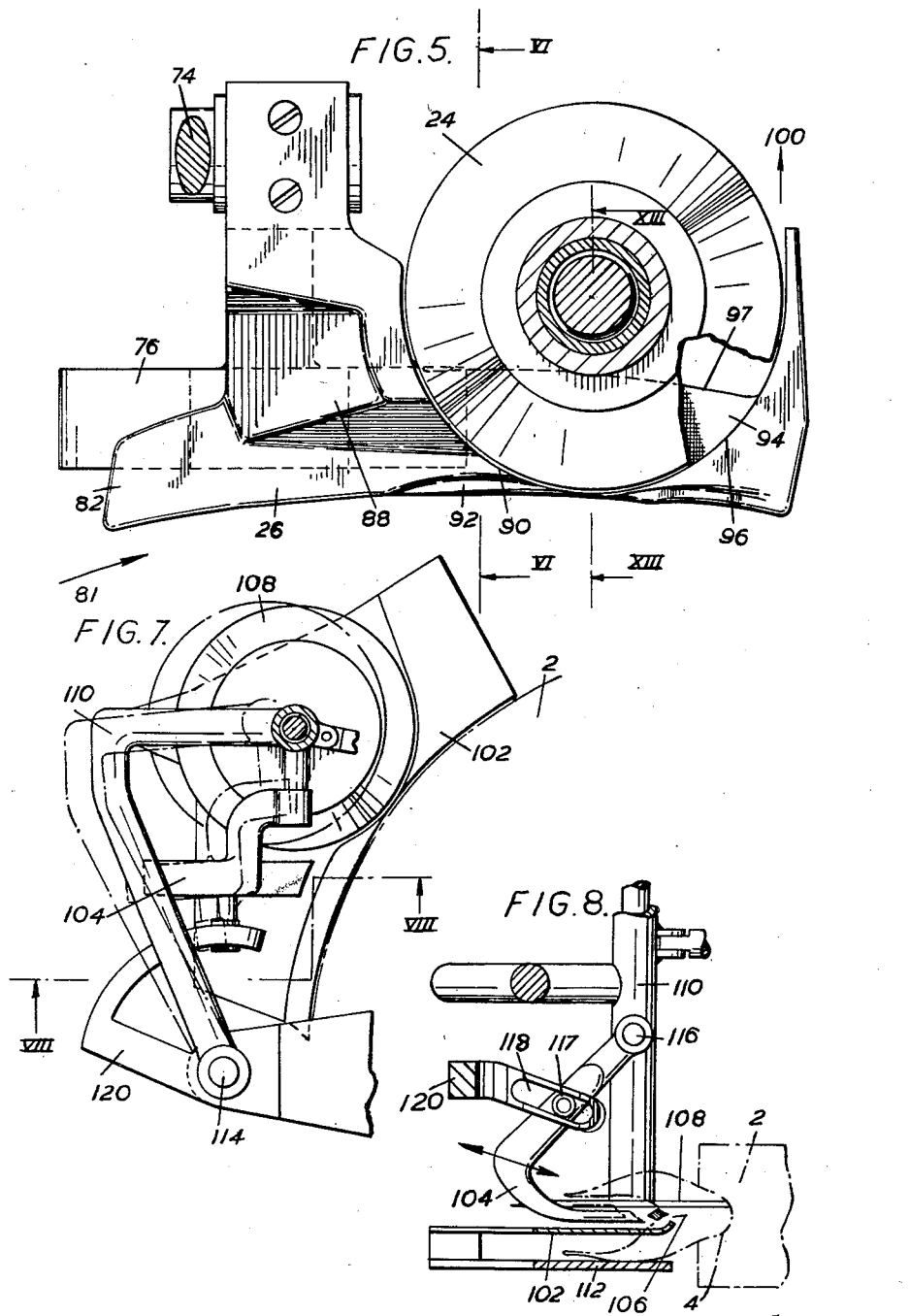
Inventor
RUDOLF BAADER
By Richard E Geier
Attorneys

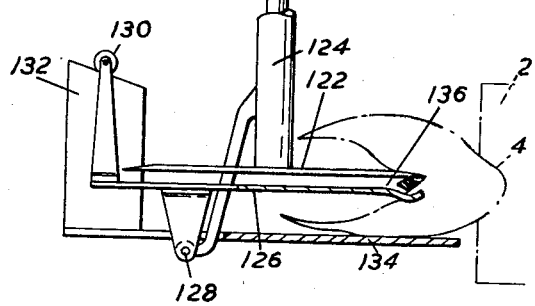
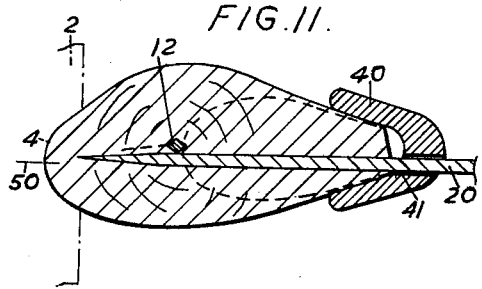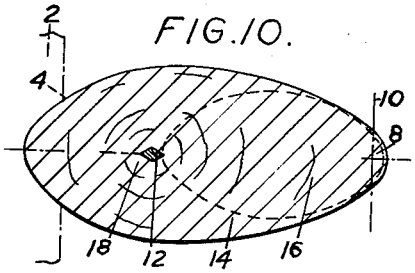
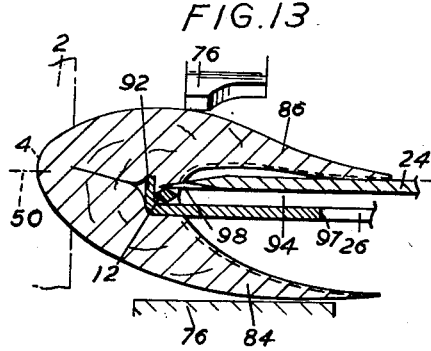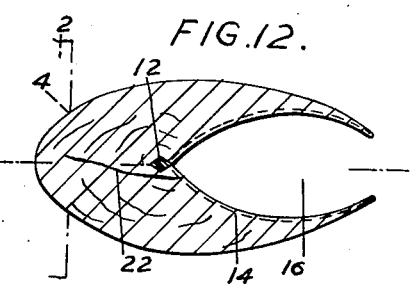
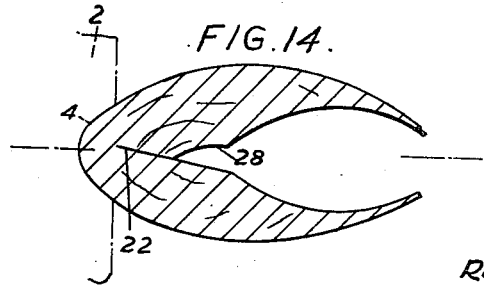

United States Patent Office 2,704,377
Patented Mar. 22, 1955

2,704,377

APPARATUS FOR REMOVING THE BACKBONES FROM FISH

Rudolf Baader, Lubeck, Germany; Rudolf Fahrig, Lubeck, Germany, executor of said Rudolf Baader, deceased, assignor to Nordischer Maschinenbau Rudolf Baader, Lubeck, Germany, a German firm Application August 19, 1950, Serial No. 180,378

3 Claims. (Cl. 17—4)

The present invention relates to an apparatus for removing the backbones from fish and is of particular value in the dressing of herrings.

In present apparatus for boning fish the backbone may be separated from the surrounding flesh either by making cuts in the fish or by tearing the bone from its place. Once it has been separated from the flesh it must be carried clear of the remainder of the fish. Hitherto when cuts have been made in the fish they have been made by two parallel rotary disc knives which are carried on a single shaft and which pass one on each side of the backbone. These cuts leave the backbone adhering to a strip of flesh as wide as the bone and not only is a plough-like tool or a spiked wheel necessary to pull the backbone from its place, but in addition the strip of flesh between the cuts is removed from the fish and wasted.

It is an object of the present invention to separate the backbone from a fish without loss of flesh.

It is a further object to separate the backbone by making two cuts only to free the backbone from all surrounding flesh.

It is a further object to remove the backbone as it is freed from the flesh.

It is a still further object to provide apparatus including two knives by which the backbone is separated from a fish.

With these and other objects in view the main feature of the present invention is that the fish is cut longitudinally by two knives which operate on the fish not simultaneously but in succession. When this is done it is possible to make the cuts converge to meet between the backbone and the back surface of the fish. The two knives may be rotary disc knives turning in the same or parallel planes and the fish may be directed to the knives by guides which cant the fish first one way and then the other.

A further feature is that the second of the two knives may serve in addition to carry the backbone clear of the fish. Preferably this second knife is a rotary disc knife and cooperates with a plate which enters the cut made by the first knife. In the plate there is a curved recess which follows the circumference of the knife, and the backbone is gripped between the face of the knife and the walls of the recess and by the rotation of the knife is carried clear of the fish.

Yet another important feature is that arrangements may be made for the second knife to be shifted as each fish passes so as to follow the line of its backbone, and also for the clearance between the second knife and the plate to vary in accordance with the thickness of the backbone of each fish.

Further objects and features of the invention will appear from the following description of the preferred apparatus embodying the invention and of modifications thereof. In this description reference is made to the accompanying drawings forming part of the specification, in which:

Figure 2 is a perspective view of the second knife assembly;

Figure 3 is a plan of the two assemblies;

Figure 4 is an elevation of the first knife assembly seen in the direction of the arrow IV in Figure 3;

Figure 5 is a plan of the lower part of the second knife assembly, being a section on the line V—V in Figure 6;

Figure 6 is a vertical section on the line VI—VI in Figure 5;

Figure 7 is a diagrammatic plan of a modified second knife assembly;

Figure 8 is a vertical section on the line VIII—VIII in Figure 7;

Figure 9 is a diagrammatic vertical section through another modified second knife assembly; and Figures 10 to 14 are sections of a herring illustrating the operation of the two knife assemblies.

Figure 1:
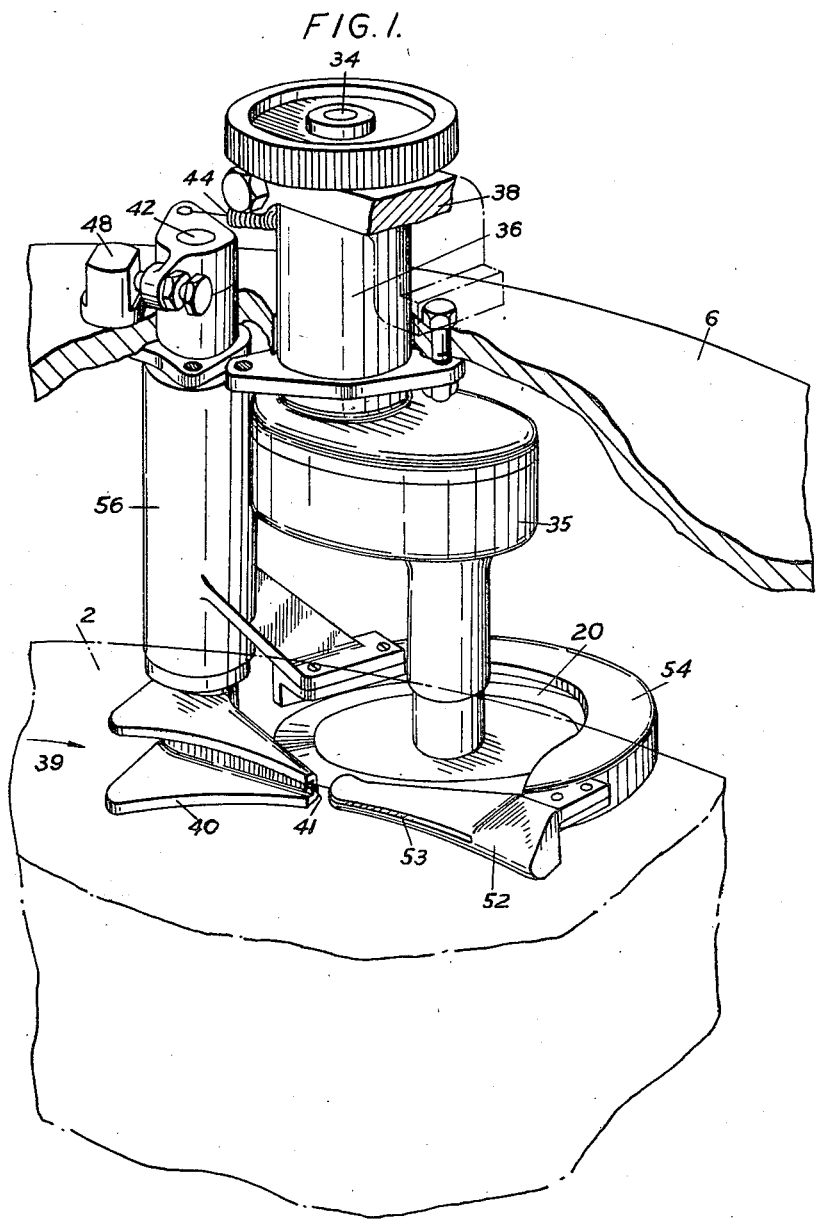
Figure 1 is a perspective view of the first knife assembly.

The herrings are carried by a drum 2 with their backs lodged in a groove 4 and pass a number of tools which are mounted on a stationary plate 6 above the drum.

Figures 10 to 14 illustrate the sequence of operations performed on the fish, each figure being a cross-section through the fish at its thickest part. Fish enter the machine whole as shown in Figure 10 and before they reach the first knife assembly they have their heads cut off and also have a thin strip 8 cut off along a line 10. Figure 10 indicates the position of the backbone 12, ribs 14, belly cavity 16 and spines 18.

The first knife 20 makes a cut below the backbone 12 as shown in Figure 11. During this operation the fish is deformed by guides with the result that the shape of this cut is as shown at 22 in Figure 12. Between the first and second knife assemblies the fish passes a tool which cleans the guts from the belly cavity 16.

The second knife 24 makes a cut above the backbone 12 as shown in Figure 13 and cooperates with a plate 26 to carry the backbone clear of the fish. This second cut is shown at 28 in Figure 14. The fish then passes a tool which cuts thin slices from the inner faces of the belly walls and so removes the ribs 14. The fish is then in the fully cleaned state shown in Figure 14.

Turning now to the construction of the apparatus and particularly to Figures 1 and 4, the first knife 20 is carried by a vertical shaft 30 which is driven through gearing 32 by a shaft 34. The shaft 30 is journalled in a housing 35 which can turn in a boss 36 fixed to the plate 6. The top of the housing 35 is gripped by a clip 38 and so the housing is normally fixed. When the knife 20 is sharpened from time to time its diameter decreases and then the clip 38 is eased and the housing 35 is swung to maintain the cutting edge of the knife at a constant distance from the drum 2.

Fish approaching the knife 20 in the direction of the arrow 39 are directed by a guide 40 which is a hollow V in section and embraces the outer faces of the belly walls as shown in Figure 11. This guide is slotted at 41 to clear the knife 20 and is carried on a vertical shaft 42 which can turn against the action of a spring 44. Thus as a fish passes the knife 20 the guide 40 can yield, say to a position 46 (shown in Figure 3). Inward movement of the guide 40 is limited by a stop 48.

As shown in Figure 11 the knife 20 is slightly above the centre line 50 of the groove 4 in the drum 2 and the guide 40 is mounted with its centre line slightly above that of the knife. Thus the fish is canted upwards and the knife makes the cut 22, which if the fish is straightened out is seen to curve round the backbone 12 close to the spines 18. This cut passes through the lower ribs 14 close to the backbone 12.

The cut 22 made by the knife 20 is opened by a guide 52 so that the fish is ready to have its guts removed by a tool lying between the two knife assemblies. This feature is described in greater detail in my co-pending patent application Ser. No. 192,305, now Patent No. 2,683,893, issued July 20, 1954. This guide is slotted at 53 to clear the knife 20 and is carried on the end of a knife guard 54 which is secured to a sleeve 56 concentric with the shaft 42. This sleeve can turn against the action of a spring 58 so that as a fish passes, the guide 52 yields, say to a position 60 (shown in Figure 3). Inward movement of the guide 52 is limited by a stop 62.

The second knife 24, as shown in Figures 2, 5 and 6, is carried on a shaft 64 which is driven through gearing 66 from a shaft 68. The shaft 64 is journalled in a housing 70 which can swing about the axis of the shaft 68 under the control of a link 72. The housing 70 has a downwardly extending arm 74 which carries the plate 26 and a bottom guide 76 and also a pivoted upper guide 78 which is loaded by a spring 80. The casing 70 is connected with a casing 201 swingable about a bolt 202 shown in Fig. 2. As shown in Fig. 3, the bolt 202 may be shifted within a slot provided in the plate 6 and may be firmly held in a number of positions, thereby shifting the axis of rotation of the casing. The casing 70 is rotated by the lever 72 (Fig. 3). The lower head 203 of the bolt 68 is spaced from the casing or carrier 201. It should be noted that the casing 70 is swung by the lever 72 about the bolt 202 only to the extent of a few millimeters, so that the gears 66 will not be disengaged.

A two-armed lever, having arms 204 and 205, is rotatably mounted upon the arm 74. A guide 78 is mounted on the arm 204 while the arm 205 engages the spring 80. The extent of pressure exerted by the guide 76 depends upon the force of the spring 80. The downward movement is limited by a bolt 206 mounted in the carrier 201, while the force of the spring is set by a screw 207 carried upon an angular lever 208 which is rotatably mounted upon the carrier 201. The screw 207 engages the casing 70. If, by way of example, the screw 207 is turned to the right, the angular lever 208 is rotated counter-clockwise (looking in the direction of Fig. 2), and the tension of the spring 80 is increased since the other end of the spring 80 is connected with an arm of the angular lever 208. Then the guide 78 presses with greater force.

As a fish approaches the second knife assembly, in the direction of the arrow 81, the rounded end 82 of the plate 26 enters the cut 22 and thus the backbone 12 rides on the upper surface of the plate. The bottom guide 76 supports the lower belly wall 84 of the fish while the spring-loaded upper guide 76 presses the upper half of the fish down onto the plate 26. As the fish is carried onwards tail-first by the drum the upper belly wall 86 rides up a ramp 88 on the plate 26 and so over the upper surface of the knife 24. At the same time the edge 90 of the knife 24 begins to cut into the fish. The tail end of the backbone is curved sharply into the drum where the tail is gripped and as this curved part reaches the edge 90 of the knife 24 it is nipped between the knife and a flange 92 on the plate 26 and is cut through. Thus a stub of backbone remains at the root of the tail while the remainder of the backbone passes beneath the knife 24 into a recess 94.

This recess 94 is substantially the same depth as the thickness of the backbone 12 and is bounded by a shoulder 96 which follows an arc of the circumference of the knife 24 and is in effect a continuation of the flange 92. The recess 94 extends inwards to the edge 97 of the plate. The underside of the knife 24 has slight radial grooves 98 which grip the backbone and propel it in a circular path until it is ejected in the direction of the arrow 100 as shown in Figure 5. After it has passed the edge 97 of the plate 26, the severed end of the backbone is guided a short distance further by a vane 101 depending from the plate. As this is happening the backbone is being progressively separated from the fish by the cut 28 made by the knife 24.

As shown in Figure 13, which is a section on the line XIII—XIII in Figure 5, the knife 24 is below the centre line 50 of the groove 4 in the drum 2 and the fish is canted considerably downwards by the guides. Thus the cut 28 curves round the spines 18 and intersects the cut 22 at a point between the backbone 12 and the back surface of the fish.

The distance between the back of a fish and its backbone varies along the length of the fish. As a result, when a fish is in position against the drum 2 its backbone does not lie in a curve truly concentric with the drum. To allow for this, as each fish passes, the housing 70 is given a slight movement from and to the drum. This movement is transmitted by the link 72 from the cam mechanism. The mechanism gives the housing 70 the correct movement for each fish according to its size and thus the flange 92 enters the cut 22 to the correct extent and the knife 24 cuts as far as is required and no further.

Preferably allowance is made for the variation in thickness of the backbone 12 in accordance with the size of a fish. Figures 7 to 9 show two knife assemblies in which provision is made to vary the clearance between the knife and the plate, in accordance with the extent of movement of the knife away from the drum 2.

In the apparatus shown in Figures 7 and 8 the plate 102 cooperates with a member 104 to form a V-shaped bottom to the recess 106 between the plate 102 and the second knife 108. As a housing 110 carrying the knife 108, the plate 102 and a lower guide 112 is swung away from the drum 2 about an axis 114, the member 104 is caused to move more rapidly away from the drum and so, by opening the V, increase the effective depth of the recess 106. The member 104 is pivoted at 116 to the housing 110 and carries a roller 117 which cooperates with a slot 118 in a fixed arm 120.

In the apparatus shown in Figure 9 the second knife 122 is carried in a housing 124 to which the plate 126 is pivoted at 128. An arm on the plate carries a roller 130 which runs on a ramp 132 secured to the fixed lower guide 134. Thus as the housing 124 moves away from the drum 2, the plate 126 rocks to deepen the recess 136.

In some fish-dressing machines the sequence of operations is so arranged that the backbone although separated from the flesh remains in position until the last operation. In the application of the present invention to such machines, the cut 22 is completed at this last operation by a third rotary disc knife and two fillets of flesh are pulled away, one from each side of the backbone. The backbone itself remains attached to the tail, which is then released from the drum. When this is done the plate 26 or its equivalent is omitted and the second knife serves only to make the cut 28 and not to nip through the backbone nor to propel the backbone clear of the fish.

I claim:

1. In an apparatus for dressing fish, such as herrings, in combination, a casing, a first rotary disc knife, a second rotary disc knife, means carried by said casing and supporting said knives in spaced relationship in the same plane, means connected with the first-mentioned means for causing said two knives to make successive cuts through the belly of a fish beyond the backbone, and a guide connected with said casing and located adjacent said knives, said guide being curved for canting fish fed to said knives to guide said cuts on opposite sides of the backbone.

2. In an apparatus for dressing fish, such as herrings, in combination, a casing, a first rotary disc knife, a second rotary disc knife, means carried by said casing and supporting said knives in spaced relationship in the same plane, means connected with the first-mentioned means for causing said two knives to make successive cut through the belly of a fish past the backbone, and a plate connected with said casing and located adjacent the second knife, said plate having a curved recess formed therein to receive the backbone of the fish.

3. In an apparatus for dressing fish, such as herrings, wherein the fish travels on a drum with their backs in a circumferential groove formed in the drum and having serrated walls, in combination, a casing, a first rotary disc knife, a second rotary disc knife, means carried by said casing and supporting said two knives in spaced relationship in the same plane, means connected with the first-mentioned means for actuating said two knives to cause them to make successive cuts through the belly of a fish and beyond the backbone, and a plate connected with said casing and located adjacent the second knife, said plate having a curved recess formed therein to receive the backbone of the fish.

References Cited in the file of this patent

UNITED STATES PATENTS

| | | |
|---|---|---|
| 1,920,339 | Baader | Aug. 1, 1933 |
| 2,180,303 | Baader | Nov. 14, 1939 |
| 2,518,772 | Grousgruber | Aug. 15, 1950 |
| 2,577,686 | Hunt | Dec. 4, 1951 |